Oct. 11, 1960 — A. W. SORENSON — 2,955,593
VISUAL ACCOMMODATIVE-ROCK THERAPY INSTRUMENT
Filed Dec. 19, 1957 — 2 Sheets-Sheet 1

INVENTOR:
ALFRED W. SORENSON
BY: *Arthur J. Sorenson*
ATTORNEY

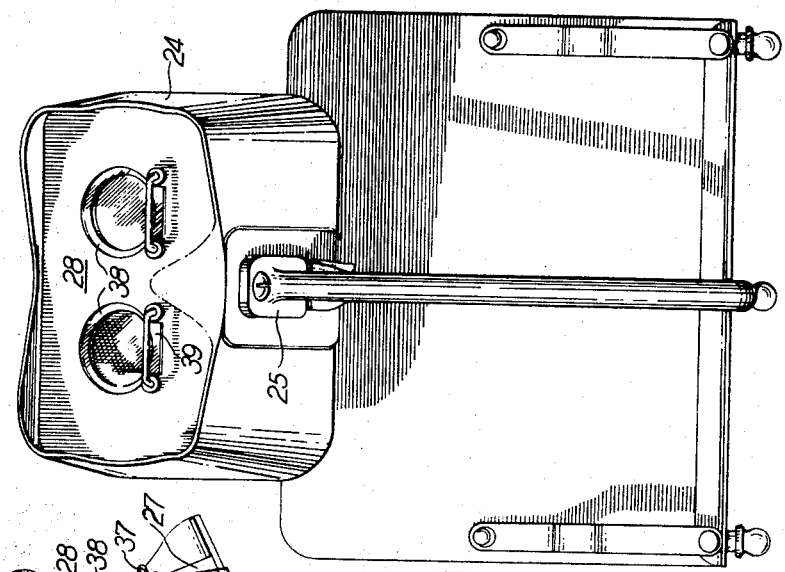
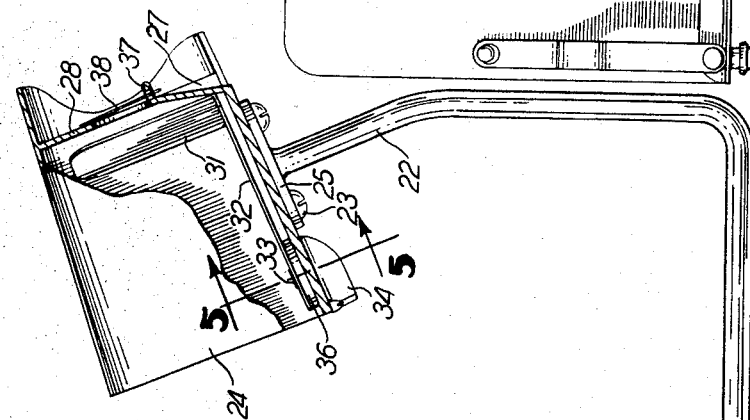
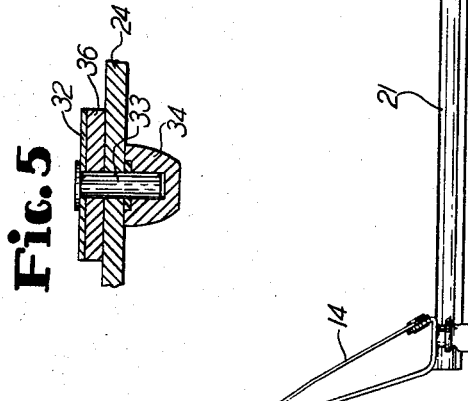

United States Patent Office 2,955,593
Patented Oct. 11, 1960

2,955,593
VISUAL ACCOMMODATIVE-ROCK THERAPY INSTRUMENT

Alfred W. Sorenson, Racine, Wis., assignor to Visual Therapy Products Corporation, Racine, Wis., a corporation of Wisconsin Filed Dec. 19, 1957, Ser. No. 703,879

2 Claims. (Cl. 128—76.5)

This invention relates to an orthoptic instrument and, more particularly, it relates to a visual accommodative-rock therapy instrument.

Initially, brief mention will be made of the fact that visual efficiency is dependent upon two main factors, namely the accommodation mechanism and the convergent mechanism and, of course, accommodation relates to the visual focus, and convergent relates to the visual fixation. For visual efficiency, it is essential that the two factors work together as an integrated and coordinated pair, and they must operate with an elasticity between them so that there is efficient binocular vision. In cases of visual inefficiency, there is a break-down in the relationship of the factors, and though binocular vision will continue, there will be a distinct loss of visual efficiency, and this produces a constricted movement in both the accommodation and the convergent factors. When the factors which disrupted the stability of efficient binocular vision are not corrected, the constriction of movement becomes habitual, and the continuance of this habit decreases the efficiency of the vision.

It is a primary object of this invention to provide a visual therapy instrument which can be employed to interrupt the habit of constriction of movement and to restore the normal visual ability of accommodation. In accomplishing this object, the instrument eliminates the possibility of binocular vision and permits the user to exercise the accommodation mechanism and monocular function.

Another object of this invention is to provide a visual therapy instrument which employs a single piece of reading material capable of being read by either eye with the movement of only one part of the instrument. In accomplishing this object, a single piece of reading material is available for the exercise of either eye, and thus continuous reading can be carried on during the exercising, and the shiftable part or shutter permits ready viewing of the reading material by either eye.

Still another object of this invention is to provide an instrument having the aforementioned characteristics and with the instrument being light in weight and compact in size so that it can be readily and easily transported from a doctor's office to the home of the user or like points of destination.

Other objects and advantages will become apparent upon reading the following description in light of the accompanying drawings, wherein:

Fig. 2 is a side elevational view of the instrument shown in Fig. 1, but showing the opposite side thereof and having parts broken away and parts in different positions.

Fig. 3 is an end elevational view of the instrument shown in Fig. 1.

Fig. 5 is a sectional view taken on the line 5—5 of Fig. 2.

The same reference numerals refer to the same parts throughout the several views.

Figure 1:
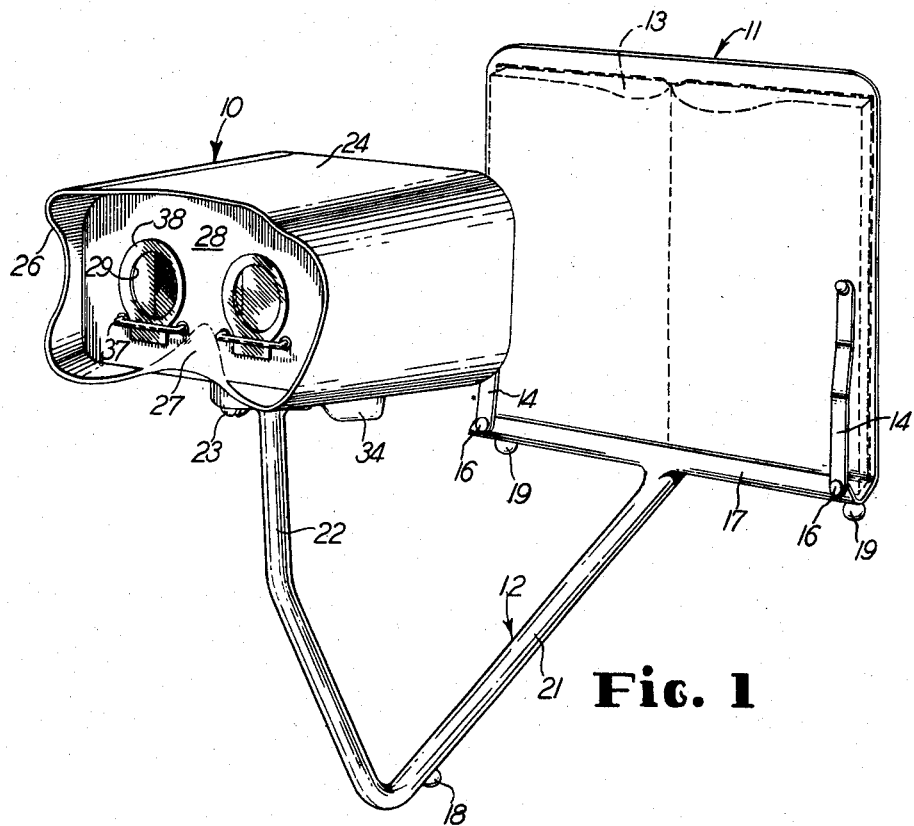
Fig. 1 is a rear perspective view of an instrument incorporating a perferred embodiment of this invention.

The drawings show the instrument of this invention to consist generally of a headpiece or viewer 10 and a target or reading material holder 11 with an intermediate and interconnecting member 12. Reading material, generally designated 13 and shown in book form, is disposed in the holder or support 11 to maintain the reading material in the desired upright position, and two spring clips 14 are pivoted to the holder 11 by rivets 16 which permit the upper ends of the clips 14 to bear against the reading material and maintain the latter in the holder 11. Also, a trough 17 is formed at the lower edge of the holder 11 to further retain the reading material in the set and desired position as shown. The member 12 is the rigid interconnecting piece between the viewer 10 and the holder 11 and is shown to be of a tubular shape, and it serves as a stand for the instrument with a lower foot or support 18 attached intermediate the length of the member 12 such that the support 18 along with the similar supports 19 attached below and at opposite ends of the holder trough 17 form a triangular support for the instrument. Thus the instrument can be readily placed onto a horizontal surface and can be retained in that position while being used in the manner described hereinafter.

It will be seen that the member 12 has a first or horizontal section 21 and a second or upright section 22, the latter of which supports the headpiece or viewer 10 by means of screws 23 securing a flange 25 at the upper end of the section 22 to the underside of the viewer 10.

Figure 4:
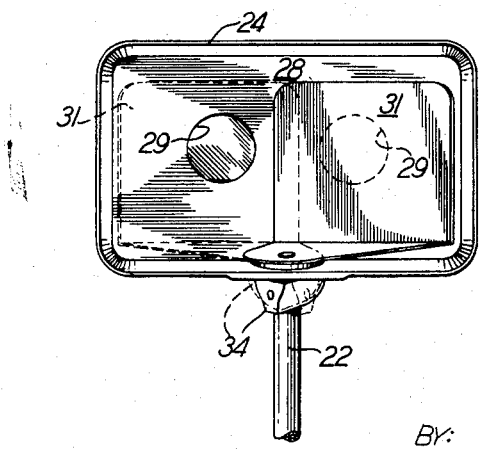
Fig. 4 is an end orthographic view of a part of the instrument and showing the end opposite to that shown in Fig. 3, but viewing directly into the part shown, and showing in dotted lines said parts in said different positions as in Fig. 2.

The viewer 10 consists of the hollow outer shell member 24 which is shown to be slightly flared outward toward the front, as seen in Fig. 4, and the longitudinal axis of the viewer is directed to the central area of the holder 11, as best shown in Fig. 2. The rear edge 26 of the shell 24 is formed as shown for the purpose of fitting to the face of the user so that there is, for instance, a recessed or indented section 27 which receives a portion of the nose of the user so that the user can position his eyes substantially within the plane of the edge 26 which is the rear end of the viewer 10. A partition 28 is also located at the rear end of the viewer 10 to extend entirely across the central opening of the shell 24 at the rear end thereof and to be disposed in a plane transverse to the axis of the viewer, as best seen in Fig. 2. A partition or wall 28 has two spaced apart circular openings or apertures 29 which are of a size and location to accommodate the viewer's eyes so that the user or viewer can read the material 13 held in the holder 11.

It is also important to notice that an L-shaped shutter is disposed in the viewer 10 in front of the partition 28, and the shutter is mounted on the extension member 32 which forms the lower portion of the L-shape and is connected to a pivot pin 33 extending in an upright direction through the member 32 and the lower section of the shell 24, as shown in Fig. 5. The upright portion 31 of the L-shaped shutter is thus disposed in front of the partition and is one-half the width of the partition so that it will always occlude one of the user's eyes. The lower end of the pin 33 has a selector button 34 secured thereto for rotation with the pin such that one rotated position of the button correspondingly rotates the pin 33 and the shutter 31 to position the latter in front of either one of the apertures 29. A circular washer or spacer 36 is shown provided between the member 32 and the inner surface of the lower section of the shell 24 to permit shifting of the shutter 31 without resistance from the shell 24.

In this arrangement, it should be noticed that, as shown in Fig. 4, the shutter 31 can be placed in front of either aperture 29 so that the upright, occluding portion of the shutter can be utilized in occluding the view by either eye which has the shutter in front of the eye when the user's eyes are aligned with the apertures 29. Also, it should be noted that the figure further shows that the shutter can be shifted from the solid line position to the dotted line position, and in so shifting the shutter, at no time can the user view through both of the apertures at one instance; that is, only one eye can be used at one time, and none of the reading material 13 can be seen by both eyes either during the shifting or pivoting of the shutter or in any position of the shutter. Also, the widths of the viewer and the shutter are such that the viewer provides a stop for the shutter in the outward swinging of the latter in both directions.

Figs. 1, 2 and 3 also show that there is a lens holder 37 attached to the rear side of the wall 28, and below each of the apertures 29 such that the holders 37 form lens wells for reception of lenses, as shown in Figs. 1 and 3, with the lenses 38 having a lower projecting portion 39 which can be disposed in the wells mentioned for supporting the remainder of the lens 38 over the apertures 29 so that the user will view the reading material 13 through the lenses 38. It should also be understood that if the user is already wearing glasses, then the configuration and size of the headpiece 10 is sufficient to accommodate the glasses and still permit the user to place his face immediately behind the wall 28 in a normal position of viewing through the headpiece 10. In accommodative-rock therapy, it is the practice to gradually increase the strength of the lenses 38 in the headpiece while the patient or reader reads several lines with each eye and with each strength of lens, and with this standard procedure, the doctor is able to determine whether or not the patient's accommodative facilities are adequate, and such information is derived from observing the diopter strength of the lenses through which the patient can continue to read the reading material. The holder 11 is thirteen inches from the lenses, and it is known that a reader must expend three diopters of accommodation to see clearly without lenses at this distance.

With this information and testing, the doctor can determine the accommodative function of the patient's eyes. In the exercising of the eye, lenses are placed within the lens wells to stimulate and inhibit the accommodative function of the eyes, but doing so independent of the convergent response of the eyes since only one eye at a time is permitted to be used and thus the convergent function required through the use of binocular vision is eliminated.

While a specific embodiment of this invention has been shown and described, it should be obvious that certain changes could be made therein, and the scope of this invention should, therefore, be limited only by the appended claims.

What is claimed is:

1. An eye therapy instrument comprising a reading material holder having an inclined flat portion and a lower horizontal trough both for supporting reading material, a viewer including a tubular shell and a wall across one end thereof at the interior of said shell and transverse to the axis of the tube and having two openings spaced apart in said wall on opposite side halves thereof for accommodating the eyes of a user, an elongated member including a horizontal portion disposed at an obtuse angle to said inclined flat portion and connected to said holder and said member including an upright portion connected to said viewer for spacing the latter two apart and with the axis of said shell being transverse to said flat portion of said holder to face said viewer toward said holder, supports attached under said horizontal portion and opposite ends of said trough for supporting said instrument on a horizontal surface, said viewer being arranged with said openings to provide for the user to view the entire said holder with either eye, and an L-shaped shutter pivotally mounted on the bottom of said shell and on an upright axis in the base portion of the L-shaped shutter and with the upright portion of said L-shaped shutter being disposed adjacent the front of said wall and at least approximately parallel thereto and being of a width approximately one-half the width of said shell and extending from one side wall of said shell to a distance in front of the space between said openings for selective positioning in front of either of said openings to obstruct the user's view of said holder with either eye.

2. A visual accommodation-rock instrument for therapy of either eye but only one at a time for the function of visual accommodation without the function of visual convergence, the instrument comprising a holder for supporting reading material in an upright position, a viewer including a hollow and elongated shell-type casing with its elongated axis transverse to and directed at said holder and with the rear end of said casing being on the side thereof away from said holder, a partition disposed entirely across the rear end of said casing transverse to the axis thereof, said partition having a pair of apertures spaced apart a distance to align with the eyes of a user, a member attached between said holder and said viewer for securing the two spaced apart a fixed distance, said viewer with said apertures being arranged with the field of sight through either of said apertures including the entire said holder to place all of said reading material in view by either eye of the user, an L-shaped shutter pivotally mounted on said casing forward of said partition and being disposed entirely therewithin and with the upright portion of said L-shaped shutter disposed in front of said partition and being of a width one-half the width of said partition for selective movement to a position in front of either said aperture for occluding the view of said reading material by either eye of the user, means on the exterior of said viewer for pivotally moving said shutter, and lens wells attached to the rear side of said partition for removably supporting lenses over each of said apertures.

References Cited in the file of this patent

UNITED STATES PATENTS

| | | |
|---|---|---|
| 276,732 | Trowbridge | May, 1, 1883 |
| 2,033,634 | Higley | Mar. 10, 1936 |
| 2,545,180 | Walraven | Mar. 13, 1951 |
| 2,614,557 | Ellis | Oct. 21, 1952 |